April 5, 1955

J. O. COLONNA 2,705,407

SEA WATER FRACTIONATION

Filed Feb. 10, 1950

INVENTOR.
JOHN O. COLONNA

BY
Emery, Holcombe & Blair

ATTORNEYS

April 5, 1955

J. O. COLONNA 2,705,407

SEA WATER FRACTIONATION

Filed Feb. 10, 1950

INVENTOR.
JOHN O. COLONNA
BY
Emery, Holcombe & Blair
ATTORNEYS

United States Patent Office 2,705,407
Patented Apr. 5, 1955

2,705,407

SEA WATER FRACTIONATION

John O. Colonna, Falls Church, Va.

Application February 10, 1950, Serial No. 143,580

13 Claims. (Cl. 62—124)

This invention relates to a method and apparatus for separating sea water into two fractions, one containing the majority of the salts, and the other being sufficiently free from salts to serve as a potable liquid. It is not intended that chemically pure water be secured by this process, or that all of the water be separated from the salts. Rather it is the purpose of my invention to separate only so much of the water as may be drawn off without crystallizing the salts out of solution, and bring it to a degree of purity sufficient to make it suitable for drinking purposes, crop irrigation, and those industrial uses which do not require absolute chemical purity. The concentrated solution of salts which will remain after the potable water is drawn off may be further processed to recover any of the component salts which may be desired.

I accomplish this result by introducing sea water which has been pre-cooled to a temperature barely above its freezing point into a centrifuge and subjecting it to a further cooling at a carefully controlled temperature while it is within the centrifuge. Ice crystals will form, and these will be relatively pure ice. However, in most such processes presently in use this takes place in a relatively stationary liquid, and the ice crystals tend to form themselves into little containers trapping salt water in their recesses. In my process, the ice crystals, being lighter than the salt solution, come to the inner side of the mixture during centrifuging, while the heavier salt solution is forced outwardly. Consequently, little salt solution is trapped, and a relatively pure ice is obtained.

The detailed operation of this method can best be explained by reference to the attached drawings of an apparatus suitable for use in connection therewith in which.

Figure 1:
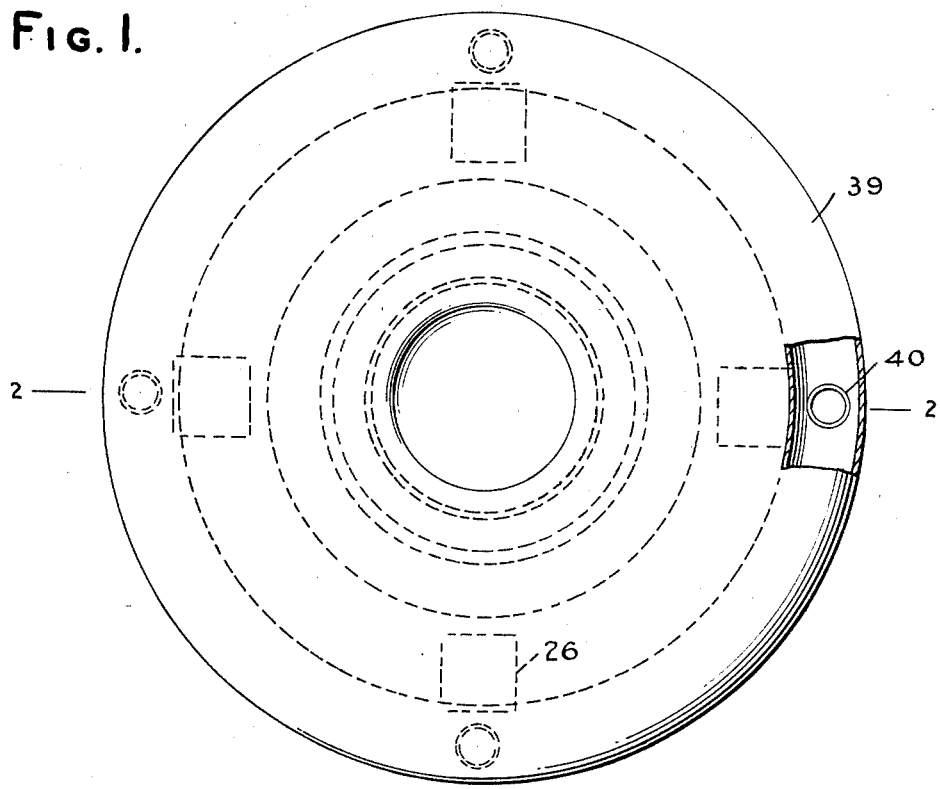
Figure 1 is a top plan view of my new device.
Figure 3:
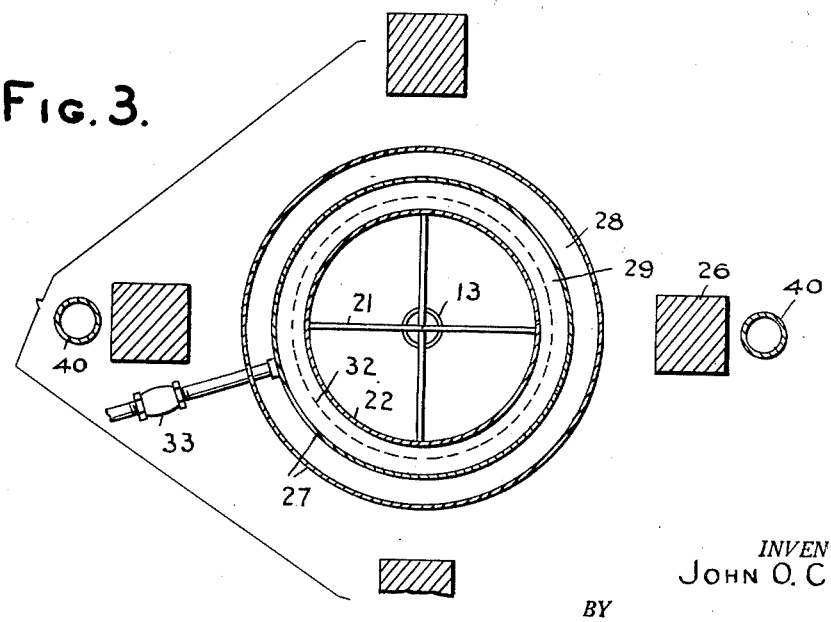
Figure 3 is a horizontal cross section taken along the line 3—3 of Figure 2.
Figure 2:
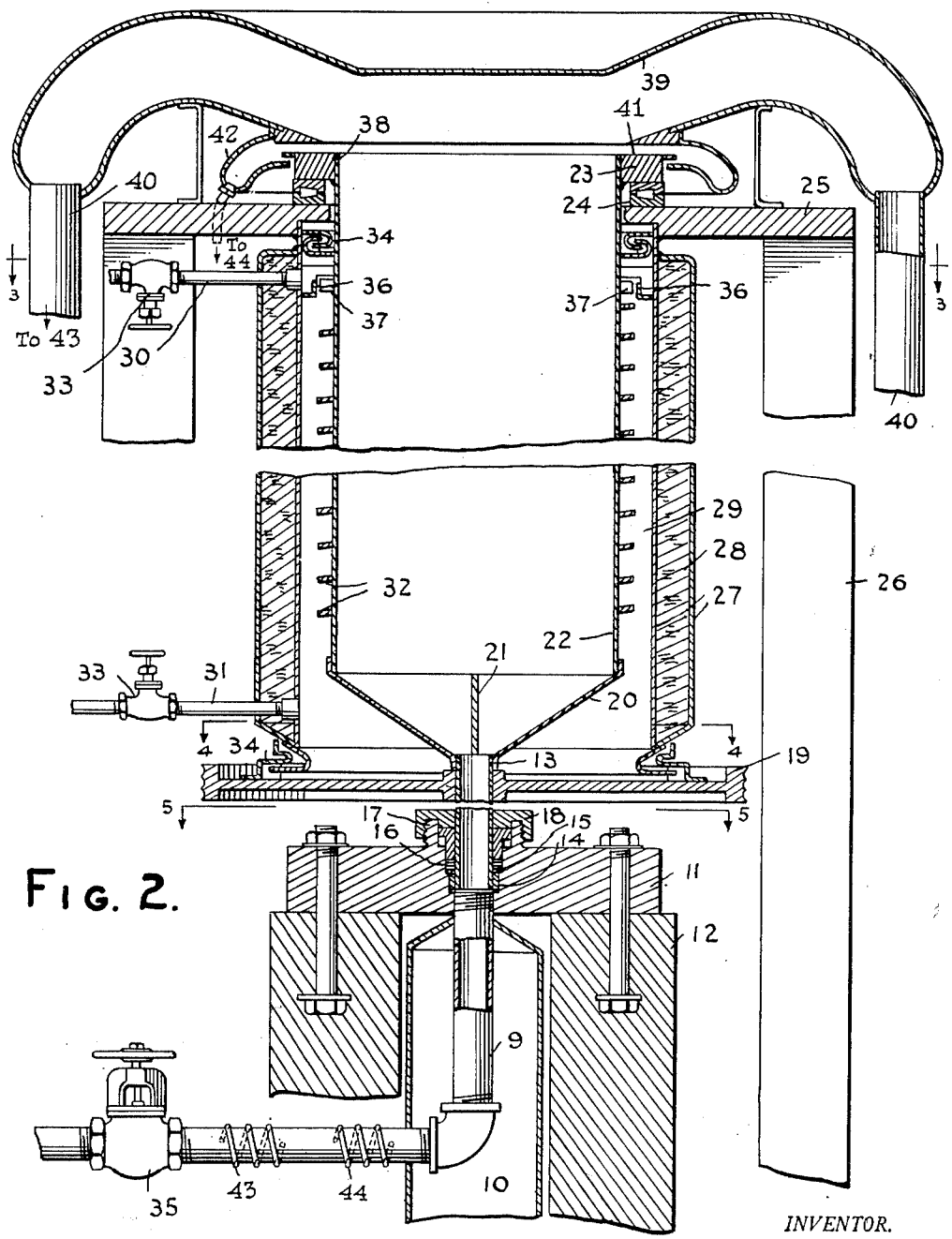
Figure 2 is a vertical cross-section taken along the line 2—2 of Figure 1.
Figure 4:
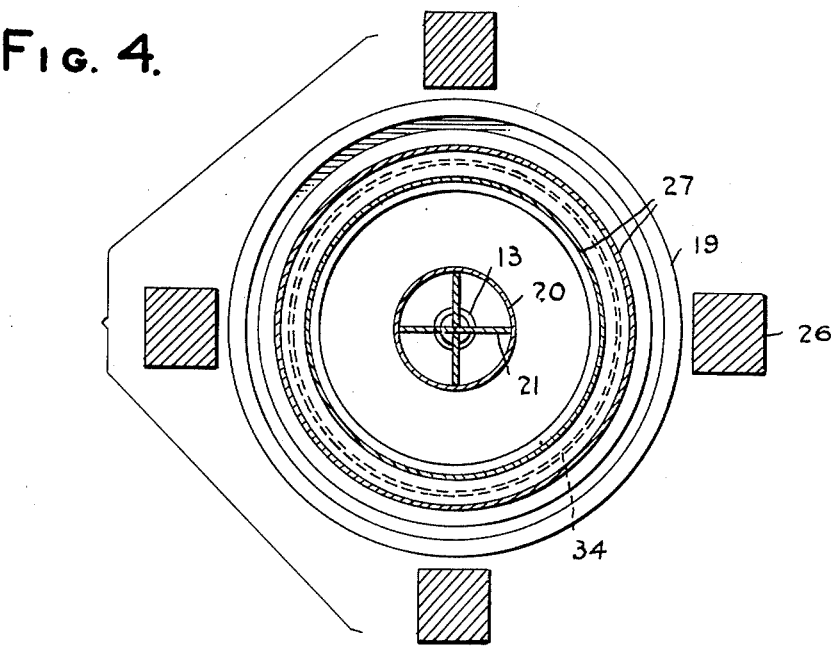
Figure 4 is a horizontal cross section taken along the line 4—4 of Figure 2.
Figure 5:
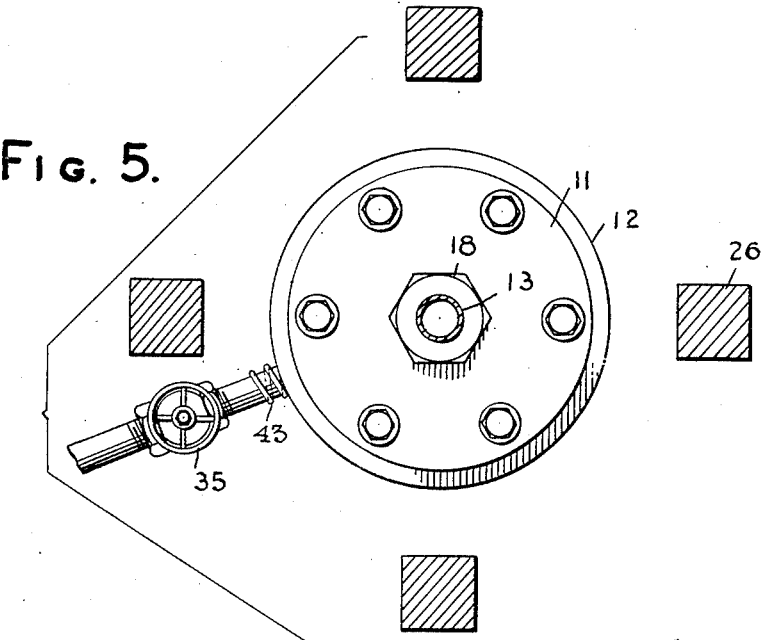
Figure 5 is a plan view looking downward from the line 5—5 of Figure 2.

In an apparatus suitable for utilizing my process a sea water inlet pipe 9 passes through a pre-cooler 10 and is threaded into a steel base plate 11, carried on a concrete base 12. This pipe 9 delivers sea water to a transition member 13, mounted in the steel base plate 11, by means of a rubber bearing 14, brass separating washer 15, hydraulic packing 16, brass packing thimble 17, and brass packing nut 18. The member 13 is driven through a pulley wheel 19 fixed thereon from a suitable source of variable speed power not shown. This member 13 is cylindrical for a short distance above the base plate 11 and then widens out into a funnel portion 20 which carries vertical impeller vanes 21. Fixed to the top of the member 13 is a cylindrical separating drum 22 which constitutes the rotating member in which the liquid is separated. This drum depends from a supporting ring 23 rotatably mounted on self-alining bearings 24 supported by the annular steel plate 25, which is carried on concrete piers 26. The rotating drum 22 is encircled by a stationary double walled cylinder 27 which depends from the annular plate 25. The space 28 between the walls of this cylinder is filled with a suitable insulating material such as cork, and the space 29 between the inner wall of the stationary cylinder 27, and the wall of the rotating drum 22 is normally filled with a suitable refrigerant fluid such as ammonia gas introduced through the inlet pipe 30 near the top of the cylinder 27, and passing through the blades 36 fixed to the stationary cylinder 27 to impinge against the rotating blades 37 fixed to the rotating drum 22, to form a turbine, thus utilizing the energy of the incoming refrigerant to help rotate the centrifuge. The refrigerant fluid then flows downwardly, passing out through the outlet pipe 31 near the bottom, its circulation facilitated by the helical fins 32 fixed to the outer surface of the rotating drum 22. These fins also serve to increase the available heat exchanging surface. Both inlet and outlet pipes are controlled by suitable valves 33.

Escape of refrigerant fluid from between the rotating and stationary cylinders is prevented at top and bottom by the centrifugal seals 34.

In operation, pre-cooled sea water is introduced through the inlet 9, under control of the valve 35. As it enters the conical member 20 rotary motion is imparted to it by the impeller vanes 21 and centrifugal force drives it up the sides of the rotating drum 22. Since the water is already virtually at its freezing temperature when introduced into the drum, crystallization of ice begins soon after it comes into contact with the heat exchanging surface thereof, as the heat of fusion is lost. These individual crystals are relatively pure water, and since the sea water with the salts in solution therein has a higher specific gravity than the ice, the salt water will be carried up the inner surface of the cylinder, and the ice travels up a cylindrical path inside of the salt water. Since at these temperatures the specific gravity of water decreases with a decrease in temperature, the colder part of the water tends to separate from the warmer part even before the ice is actually formed, and this factor assists in ensuring that the ice will be formed on the inside and the brine retained on the outside as the solution travels upward. This is of the utmost importance, not only in order to separate the ice from the salt solution, but to prevent the ice from adhering to the heat exchanging surface of the drum. Ice is an excellent heat insulator and it is one of the most common defects of conventional ice making apparatus to have the ice form on the cooling surface. This materially reduces the efficiency of the apparatus once the ice has begun to form. In my device the salt solution is always on the outside, between the cooling surface and the ice, and this insulating effect is avoided, thus not only improving efficiency but making possible continuous operation, since there is no need to close down the machine at frequent intervals to remove the ice from the cooling surface.

As the ice and the encircling brine travel upwardly the latter becomes more and more concentrated. When the outlet 41 is reached the brine is thrown outwardly by centrifugal force through the passage 41 to drain 42. A sharp corner at 38 utilizes the normal tendency of the brine to adhere to the drum surface to assist in leading the brine toward this passage.

The ice, being innermost and lighter, is thrown outward and upward into the collector casing 39 from whence it falls through pipes 40 to a suitable reservoir. As the concentrated brine and melting ice flow off they are led through heat exchangers 44 and 43 respectively in order that they may absorb heat from the incoming sea water and from the ammonia compressor in a regenerative process.

In order for this method to be successful the temperature of the water introduced into the centrifuge and that of the refrigerant fluid must be carefully controlled, together with the length of time the sea water is in the centrifuge. The latter is regulated by varying the volume of water admitted per minute, and the speed of rotation of the centrifuge. The speed of rotation necessary to drive the water up the rotary wall of a machine of a given size may be calculated by formulas well known to those skilled in the art, and this speed will determine the minimum R. P. M. at which the drum 22 may be operated. It is desirable to bring the water to a point barely above its freezing temperature before introducing it to the centrifuge. The walls of the rotating drum should be kept at a temperature below this freezing point (approximately $-3$ degrees centigrade), but above $-8$ degrees centigrade, the temperature at which certain of the component salts begin to crystallize out. If this is done, the ice will begin to form shortly after the sea water comes in contact with the heat exchanging surface of the rotating drum. The flow of water and speed of the drum must then be regulated so that the speed of the water up the drum will be sufficient to permit formation of as much ice as it is practical to take from each cubic foot of water within the temperature range of the apparatus.

It will prove advantageous to carry the cylindrical portion of the transition member 13 sufficiently far above the base plate 11 to permit the packing about it to be replaced by sliding the member 18 far enough up to permit access to the packing without encountering the pulley wheel 26.

While the rotating drum has been referred to herein and is shown in the drawings as cylindrical, in order to secure a uniform vertical speed of the water up the sides of the drum it will actually be necessary to gradually increase its diameter from bottom to top. However, this increase is so slight as to render it impractical to illustrate it on the small scale drawings submitted with this application. The total increase in diameter from bottom to top will be such as to produce a deviation from the vertical in the side walls of the drum of less than one degree. The exact figure will vary with the diameter, and contemplated speed of operation but may be calculated by formulas well known to those skilled in the art.

The inlet pipe 12 has been described as stationary, but the operation of the machine may be improved by mounting this pipe as well as the drum 22 for rotary motion. This will impart a slight rotation to the liquid before it enters the drum, start off the process of separating the colder portion of the water from the warmer, by reason of the difference in their specific gravities, and permit the swirling water in the inlet to be cooled as much as possible without formation of ice so that only a small withdrawal of heat of fusion when the water is introduced into the centrifuge will serve to initiate crystallization.

While the process and machine have been designed primarily for the fractionation of sea water, it will be readily apparent that by suitably modifying the relative temperatures of the centrifuge and pre-cooler, and the speed of and volume handled by the centrifugal drum, the process and machine may be used for separating the solids in many liquids from the water therein. This will make my invention useful in the concentration of milk, fruit juices, and the like.

The word "centrifuge," when used as a verb in this application means to separate solids from liquids, or liquids from other liquids, of different specific gravities, by subjecting them to fast smooth rotation at a speed sufficient to overcome the forces tending to retain them in a relatively unseparated condition. When used as a noun, "centrifuge" means apparatus adapted to accomplish such separation.

Operation of the machine may be made automatic by making the position of the sea water inlet valve and speed of the driving motor dependent upon thermostatic controls responsive to the exact temperature of the cooling surface of the rotating drum, and by regulating the flow of the refrigerant in a similar manner.

I claim:

1. The method of continuously separating an original solution into a liquid fraction more concentrated and heavier than the original solution and a crystalline fraction less concentrated and lighter than the original solution, said method comprising the steps of withdrawing heat from the exterior of said solution until said crystalline fraction forms therein while simultaneously centrifuging said solution by rotating it about a vertical axis, thereby preventing said lighter crystalline fraction from maintaining a position further from said axis than said heavier liquid fraction, additional solution being continuously added near the bottom of said axis, and said concentrated liquid fraction and said crystalline fraction being continuously thrown off along separate paths at the upper end of said axis.

2. A method as claimed in claim 1 in which said solution is a solution of salts in water and said crystalline fraction is ice.

3. A method as claimed in claim 2 in which the temperature of said solution is at all times maintained above that at which any of the component salts will crystallize out.

4. The method of continuously separating an original solution into a liquid fraction more concentrated and heavier than the original solution and a crystalline fraction less concentrated and lighter than the original solution, which method comprises the steps of precooling said solution to a temperature just above that at which said crystalline fraction will begin to form in said solution, and then centrifuging said solution by rotating it about a vertical axis while simultaneously withdrawing heat from the exterior thereof until said crystalline fraction forms; pre-cooled solution being continuously added near the bottom of said axis and said crystalline fraction and said liquid fraction being continuously thrown off along separate paths near the top of said axis and then lead back into a heat-exchanging relationship with the incoming solution to cool it.

5. A method as claimed in claim 4 in which said solution is a solution of salts in water and said crystalline fraction is ice.

6. A method as claimed in claim 4 in which a refrigerant fluid is used to cool the solution and kinetic energy from this fluid is used to help produce the centrifuging action.

7. Apparatus for making fresh water ice from sea water comprising a separating drum mounted for rotation about a vertical axis, means for circulating a refrigerant fluid about the exterior of said separating drum, inlet pipes for admitting sea water to the base of said separating drum, vertical vanes near the base of said drum for imparting rotary motion to the incoming sea water, and outlets near the top of said separating drum for separately receiving said fresh water ice and the remaining solution, which are thrown off along different trajectories.

8. Apparatus as claimed in claim 7 having means for pre-cooling the water in said inlet pipes.

9. Apparatus as claimed in claim 8 in which said means for pre-cooling the water in said inlet pipes comprises in part a heat exchanger through which the ice and remaining solution are led after being thrown off by said separating drum.

10. Apparatus as claimed in claim 7 in which said separating drum is fitted with exterior fins which increase the rate of heat exchange between the refrigerant fluid and the sea water, and assist in circulating the refrigerant fluid.

11. Apparatus as claimed in claim 7 in which the means for circulating the refrigerant fluid comprises an expansion chamber encompassing the separating drum and having suitable inlet and outlet pipes.

12. Apparatus as claimed in claim 11 in which said refrigerant inlet pipe opens into a turbine section with revolving blades fixed to exterior of the separating drum and fixed blades mounted on the interior wall of the expansion chamber.

13. Apparatus for continuously separating a desired substance in crystalline form from a solution containing that substance as a component comprising a separating drum mounted for rotation about a vertical axis, means for circulating a refrigerant fluid about the exterior of said separating drum in direct contact therewith, inlet pipes for admitting the solution to the base of said separating drum, vertical vanes near the base of said drum for imparting rotary motion to the incoming solution, and outlets near the top of said separating drum for separately receiving said crystalline substance and the remaining solution, which are thrown off along different trajectories.

References Cited in the file of this patent

UNITED STATES PATENTS

| Number | Name | Date |
|---|---|---|
| 337,716 | Todd | Mar. 9, 1886 |
| 723,152 | Gurber | Mar. 17, 1903 |
| 1,452,388 | Porter | Apr. 17, 1923 |
| 1,963,842 | Gay | June 19, 1934 |
| 2,119,182 | Schuftan | May 31, 1938 |
| 2,180,553 | Schuftan | Nov. 21, 1939 |
| 2,394,016 | Schutte | Feb. 5, 1946 |
| 2,419,881 | Borgerd | Apr. 29, 1947 |
| 2,552,525 | Wenzelberger | May 15, 1951 |

FOREIGN PATENTS

| Number | Country | Date |
|---|---|---|
| 196,631 | Switzerland | June 16, 1938 |
| 387,460 | France | July 10, 1908 |